No. 775,572. PATENTED NOV. 22, 1904.
L. D. LOVEKIN.
TOOL FOR FINISHING FLANGED PIPE.
APPLICATION FILED FEB. 25, 1904.
NO MODEL.

WITNESSES:
INVENTOR
Luther D. Lovekin
BY
ATTORNEY.

No. 775,572.

Patented November 22, 1904.

UNITED STATES PATENT OFFICE.

LUTHER D. LOVEKIN, OF PHILADELPHIA, PENNSYLVANIA.

TOOL FOR FINISHING FLANGED PIPE.

SPECIFICATION forming part of Letters Patent No. 775,572, dated November 22, 1904.

Application filed February 25, 1904. Serial No. 195,234. (No model.)

*To all whom it may concern:*

Be it known that I, LUTHER D. LOVEKIN, of the city and county of Philadelphia and State of Pennsylvania, have invented an Improvement in Tools for Finishing Flanged Pipe, of which the following is a specification.

My invention has reference to tools for finishing flanged pipe; and it consists of certain improvements which are fully set forth in the following specification and shown in the accompanying drawings, which form a part thereof.

The object of my invention is to provide a simple and efficient tool capable of being easily and expeditiously handled to finish the end of a pipe or tube of sheet metal previously flanged within a flange-ring.

In carrying out my invention I provide a mandrel comprising a shank and head having a conical frame combined with a series of inclined flanging-rollers having grooved peripheries and a central thrust-roller supported upon a stud and adapted to receive the inward thrust of the flanging-rollers.

My invention also comprehends details of construction which, together with the above-specified features, will be better understood by reference to the drawings, in which—

Figure 1:
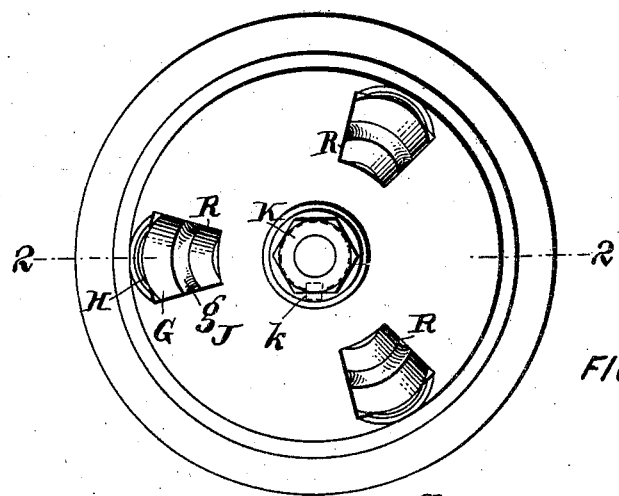
Figure 2:
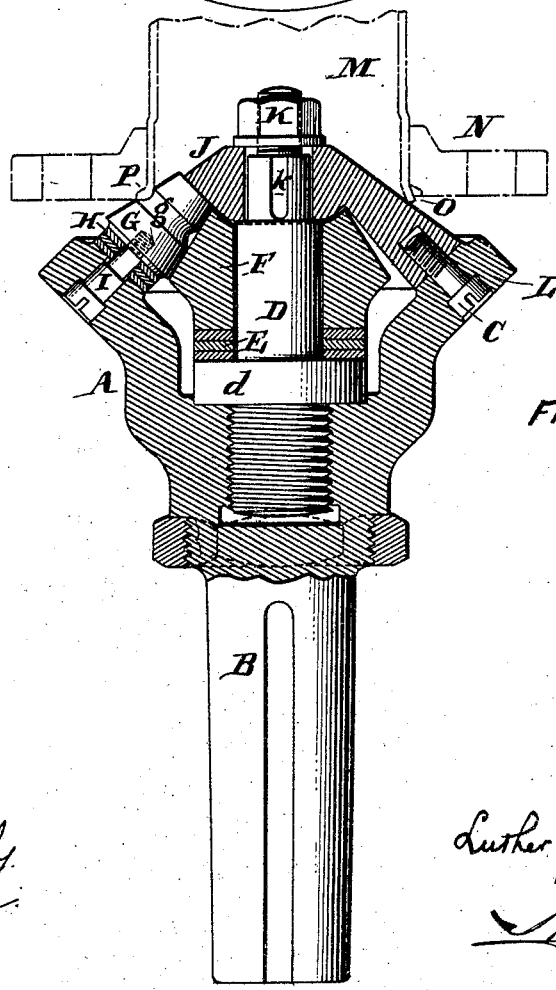

Figure 1 is an end view of a flanging-tool embodying my invention, and Fig. 2 is a longitudinal section of the same on line 2 2 of Fig. 1.

A is the mandrel-head and has a shank B to fit into a suitable machine when in use. This head A is outwardly flared, as at L, and has secured to it a conical cap J, the two parts being held together by screws C. This cap J has three slots R, in which are arranged tapering rollers G, said rollers G being held against falling out of the slots by the screws I, which act as retaining-bearings, and their end thrust is received upon antifriction-rings H. These flanging-rollers G have the annular grooves $g$ shaped to turn out and bead the flanged end $o$ of the pipe M and shape it into the rounded or beaded form, as at P. If the pipe is thin, the end may be flanged by the conical end or cap of this tool and the beading or finishing accomplished by the grooved rollers; but when the pipe is heavy the flanging is first accomplished by a tool—such, for example, as shown in Letters Patent No. 734,273 granted to me on July 21, 1903.

The inward thrust of the rollers G is received upon a central conical thrust-roller F, which is loosely journaled upon a central stud D, screwed into the hollow head A. This stud is of steel and has a flange $d$ resting on the head, and between this and the hub of the roller F, I arrange antifriction-rings E to receive the end thrust of said roller.

The stud D extends outwardly through the cap J and has a nut K for holding the cap in place. The stud D is further provided with a key $k$, which fits the cap to prevent it from turning and in that way taking a material strain from off the screws C. This is important, as the pressure of the rollers G against the side of the slots R when in operation is very great and would tend to rotate the cap upon the head.

The rollers G are preferably made conical except where the groove $g$ is located and these conical portions rest directly upon the conical surface of the thrust-roller F. The outer faces of the rollers G extend beyond the conical face of the cap J, so as to enable their grooves $g$ to operate upon the pipe end. While in practice the cap is made to completely cover the end of the tool, it is evident that it may be made of other form providing it does not extend beyond the operating-surfaces of the flanging-rollers G.

While the construction shown is most excellently adapted for the purposes of my invention, nevertheless the minor details thereof may be modified without departing from the spirit of the invention.

Having now described my invention, what I claim as new, and desire to secure by Letters Patent, is—

1. In a tool for finishing flanged pipe, a mandrel provided with means to positively rotate it and having a fixed head provided with a conical end, in combination with flanging-rollers carried by the head and having their operating-surfaces projecting slightly beyond the outer surfaces of the conical end.

2. In a tool for finishing flanged pipe, a mandrel having a hollow head provided with a fixed conical end positively rotating with the head, in combination with flanging-rollers carried by the head and having their operating-surfaces projecting beyond the outer surface of the conical end, and a loose thrust-roller arranged within the head and free to rotate and receiving the inward thrust of the flanging-rollers.

3. In a tool for finishing flanged pipe, a mandrel having a hollow head provided with a conical end, in combination with flanging-rollers carried by the head and having their operating-surfaces projecting beyond the outer surface of the conical end, a thrust-roller arranged within the head and receiving the inward thrust of the flanging-rollers, a stud within the hollow head having a flange, and antifriction-rings between the flange and hub of the thrust-roller.

4. In a tool for finishing flanged pipe, a mandrel having a head provided with a fixed conical end rotating with the mandrel, in combination with flanging-rollers carried by the head and having their operating-surfaces projecting beyond the outer surface of the conical end, journals secured to the outer ends of the flanging-rollers and journaled in the head, and antifriction-rings surrounding the journals and arranged between the rollers and head.

5. In a tool for finishing flanged pipe, a mandrel having a head provided with a fixed conical end positively rotating with the head, in combination with conical flanging-rollers carried by the head and having their operating-surfaces projecting beyond the outer surface of the conical end and made with annular beading-grooves intermediate of their ends, and a loose conical thrust-roller arranged free to rotate within the head and making contact with the end portions of the flanging-rollers.

6. In a tool for finishing flanged pipe, the combination of a mandrel having a hollow head, a removable conical-faced cap secured over the end of the head, conical flanging-rollers projecting through the cap, and a thrust-roller within the hollow head for receiving the inward thrust of the flanging-rollers.

7. In a tool for finishing flanged pipe, the combination of a mandrel having a hollow head, a removable conical-faced cap secured over the end of the head, conical flanging-rollers projecting through the cap, a central stud secured to the head and extending through the cap, a clamping-nut for the end of the stud for holding the cap to the head, and a thrust-roller within the hollow head for receiving the inward thrust of the flanging-rollers surrounding the stud.

8. In a tool for finishing flanged pipe, the combination of a mandrel having a hollow head, a removable conical-faced cap secured over the end of the head, conical flanging-rollers projecting through the cap, a central stud secured to the head and extending through the cap and having a key to hold the cap against turning on the head, a clamping-nut for the end of the stud for holding the cap to the head, and a thrust-roller within the hollow head for receiving the inward thrust of the flanging-rollers surrounding the stud.

In testimony of which invention I hereunto set my hand.

LUTHER D. LOVEKIN.

Witnesses:
R. M. HUNTER,
R. M. KELLY.